United States Patent [19]

Bailly et al.

[11] 3,933,934

[45] Jan. 20, 1976

[54] FABRICATION OF ATACTIC WAXES OF POLYOLEFIN

[75] Inventors: Jean Claude Bailly; Daniel Durand; Pierre Mangin, all of Martigues, France

[73] Assignee: Naphtachimie, Paris, France

[22] Filed: Jan. 18, 1973

[21] Appl. No.: 324,898

[30] Foreign Application Priority Data

Jan. 20, 1972 France .............................. 72.01829

[52] U.S. Cl. ..................... 260/683.15 D; 252/429 C
[51] Int. Cl.² ............................................ C07C 3/21
[58] Field of Search ......... 252/429 C; 260/683.15 D

[56] References Cited
UNITED STATES PATENTS

| | | | |
|---|---|---|---|
| 2,956,993 | 10/1960 | Nowlin et al. ................... | 252/429 C |
| 3,065,216 | 11/1962 | Tsunoda et al. ................ | 252/429 C |
| 3,101,328 | 8/1963 | Edmonds ........................... | 260/93.7 |
| 3,121,063 | 2/1964 | Tornquist ........................... | 252/429 C |
| 3,179,601 | 4/1965 | Kummer ............................. | 252/441 |
| 3,801,558 | 4/1974 | Fletcher et al. .................. | 252/429 C |

FOREIGN PATENTS OR APPLICATIONS 2,099,311   3/1972   France ............................ 252/429 C

*Primary Examiner*—Paul M. Coughlan, Jr.
*Attorney, Agent, or Firm*—McDougall, Hersh & Scott

[57] ABSTRACT

Atactic waxes and method for preparing same by polymerization of polyolefin alone or in combination with other monoolefins of the formula $CH_2 = CHR$ in which R is hydrogen or an alkyl radical having from 2 to 8 carbon atoms in which the polymerization is carried out at low pressure and in a hydrocarbon solvent in the presence of a catalyst formed of the product of the reaction of magnesium or a compound thereof, a compound of a transition metal selected from the subgroups IVa, Va and VIa of the periodic classification of elements and an alkyl halide, and a co-catalyst in the form of an organometallic compound of a metal selected of groups II and III of the periodic classification of elements.

9 Claims, No Drawings

FABRICATION OF ATACTIC WAXES OF POLYOLEFIN

The invention relates to a process for the manufacture of atactic waxes from polyolefins by polymerization of propylene with or without the addition of other olefins, and it relates to waxes produced by same.

It is known to manufacture polypropylene waxes by a polymerization technique known as a "low pressure" technique, which consists in solution polymerizing propylene in a saturated hydrocarbon solvent and in the presence of certain catalytic systems of the Ziegler type consisting of a soluble or finely divided compound of a heavy metal and an organometallic compound. The polypropylene waxes prepared according to this technique may have a more or less considerable crystallinity depending on the nature of the catalytic system employed. Among the various types of waxes, those having average or low crystallinity, generally referred to as "atactic" waxes, have wide industrial applications.

During the course of the manufacture of these atactic waxes, crystalline polymers having a molecular weight generally higher than that of the waxes likewise form in more or less substantial quantities. These crystalline polymers remain in suspension in the saturated hydrocarbon solvent, in contrast to the atactic waxes which are dissolved therein and they give rise to considerable heterogeneity in the waxes after evaporation of the solvent and cooling. It is then necessary to separate such crystalline polymers but this separation is generally difficult due to the more or less colloidal nature of these crystalline polymers suspended in the viscous solution of the atactic waxes. These difficulties mean that separation of the crystalline polymers is generally incomplete. This affects both the quality of the prepared atactic waxes and also the efficiency of their production.

Moreover, during the course of manufacture of these atactic waxes, rather large quantities of oily polymers frequently form. These oils have the drawback of being difficult to separate from the atactic waxes and of affecting their quality.

We have now found that it is possible, by polymerization of propylene or mixtures of propylene and other monoolefins, such as ethylene and/or butene-1, to produce atactic waxes of polyolefins which are virtually free from both oily polymers and crystalline polymers which are insoluble when hot in the hydrocarbon solvents, which makes it possible to eliminate the difficult separation processes previously described. The process according to the invention is likewise characterized by very high productivity of waxes in proportion to the catalyst used, which makes it possible to avoid the elimination of catalytic residues after polymerization.

The object of the invention therefore is a process for manufacturing atactic waxes from propylene by polymerization under low pressure and within a hydrocarbon solvent, or mixtures of propylene, possible with other olefins having the formula $CH_2 = CHR$ in which R is hydrogen or an alkyl radical having 2 to 8 carbon atoms, such other olefins being employed in an amount less than 30% by weight and preferably below 10% by weight with respect to the propylene, followed by separation of the waxes from the solvents, but in which the polymerization is carried out in the presence of a catalytic system consisting of:

a solid compound of magnesium and a transition metal of sub-groups IVa, Va and VIa of the periodic classification of elements, this catalyst being obtained by reaction of (a) the metallic magnesium, (b) a compound of the said transition metal, and (c) an alkyl halide;

and also, as a co-catalyst, of one or a plurality of organometallic compounds of the metals of groups II and III of the classification of elements.

Catalysts suitable for the process of this invention are described in copending application Ser. No. 205,382, filed Dec. 6, 1971, entitled "Magnesium based catalyst for use in the polymerization of olefins", now abandoned.

The transition metals of sub-groups IVa, Va and IVa of the periodic classification of elements, which may be used in making up the catalyst comprise titanium, vanadium, chromium, zirconium, niobium, molybdenum, hafnium, tantalum, tungsten, thorium and uranium.

The catalysts used are preferably prepared from compounds of transition metals having the general formula $TiX_{4-m}(OR)$, in which Ti represents a titanium atom, X represents a halogen atom, generally chlorine, R represents an alkyl radical which may contain 2 to 8 carbon atoms and m represents a whole number or a fraction of any value of from 0 to 4. It has been observed that the catalysts derived from titanium compounds of the above formula in which the m is a number of from 1 to 4, and preferably 1.5 to 2.5, are particularly advantageous since they result in the formation, with a high productivity with respect to the catalyst employed, of atactic waxes which are virtually free of crystalline polymers.

The organometallic compounds of the metals of groups II and III of the periodic classification of elements, used as co-catalysts, are preferably formed of organoaluminic compounds of the general formula $AlR_nX_{3-n}$, in which R represents an alkyl group having 1 to 12 carbon atoms, in which a portion of these alkyl groups may be replaced by hydrogen atoms, X represents a halogen atom, generally chlorine, and n represents a whole number or a fraction of from 1 to 3.

In the implementation of the process of this invention, the quantity of catalyst is such that the concentration of compound based on the transition metal is advantageously between 0.5 and 2 millimoles per liter of solvent. The co-catalyst is introduced in quantities such that the atomic ratio:

of metal in the co-catalyst to transition metal in the catalyst is advantageously between 2 and 10 and is preferably between 3 and 5.

The saturated hydrocarbon solvent in which polymerization is carried out is selected of a plurality of hydrocarbons such as petroleum solvents which are liquid under the conditions of polymerization. Paraffin hydrocarbons such as n-heptane or petroleum dilutions essentially consisting of paraffins having from 6 to 8 carbon atoms, are particularly suitable for the process according to the invention because they are satisfactory solvents of atactic waxes.

In accordance with the practice of this invention, polymerization is carried out at a pressure which is generally below 20 bars and at a temperature between 40° and 150°C, and preferably at a temperature of about 80° to 90°C. When polymerization is carried out in the presence of one or more olefins in addition to propylene, it is possible to introduce into the reactor either a mixture of constant composition of propylene and the other olefin or olefins, or to vary the composition of this mixture during the course of polymerization. It is possible to vary the mean molecular weight of polymer formed, on the one hand by varying the concentration of catalytic substances in the solvent and on the other hand, by using, during the course of polymerization, a chain limiter such as hydrogen which is introduced into the reaction mixture in molecular proportions of between 10% and 80% with respect to the olefins to be polymerized. The use of a chain limiter is recommended particularly when polymerization is carried out with propylene alone; on the other hand, when polymerization is carried out with propylene plus other olefins, the addition of a chain limiter is generally unnecessary, the presence of olefins other than propylene being conducive to chain limitation.

Polymerization is arrested when the quantity of waxes to be formed is attained. However, in order to facilitate agitation during the course of polymerization, it is desirable not to exceed a concentration of around 500 g/liter of solvent in terms of waxes dissolved in the reaction solvent.

The obtained atactic waxes form with the solvent a very homogeneous solution which may be withdrawn from the reactor simply by pouring. The waxes are then separated from the solvent, for example by distillation or by steam stripping.

The atactic waxes which are thus obtained generally contain less than 100 parts per million (ppm) by weight titanium and therefore do not require any purification treatment for elimination of catalytic residues. Generally, therefore, they may be used directly.

The atactic waxes produced according to the process of the present invention take the form of plastic, homogeneous and white substances. Their specific mass is between 0.85 and 0.9 g/cc at 20°C. Their pasty fusion point is between 90° and 135°C. The fraction extracted by boiling n-heptane is greater than 95%, generally virtually 100%. Their crystallinity, determined by infrared spectroscopy, is generally less than 15% and usually does not exceed 10%. Their molecular mass is between 10,000 and 200,000 and is usually close to 50,000.

By virtue of their properties, these atactic waxes can be used in various industrial applications, particularly in the manufacture of adhesives.

EXAMPLE 1 a. Preparation of the catalyst.

Into a 5-liter stainless steel reactor, fitted with a mechanical agitator and a means for heating or cooling by circulation of fluid in a double jacket, there are introduced, in sequence, and in a nitrogen atmosphere:
12.2 g (500 millimoles) of powdered magnesium;
24 g (125 millimoles) of titanium tetrachloride;
1.3 g iodine;
and dry n-heptane to a volume of 800 ml.

The whole is heated to 75°C. When the reactor is closed, 93 g (1 mole) of n-butyl chloride is gradually introduced over a period of approximately 2 hours. The reaction medium is then maintained for 1 hour at 90°C, with agitation.

A brown-black precipitate is collected and washed repeatedly with n-heptane. Its weight composition is as follows:
Ti : 10.3% Mg : 19.2% Cl : 70.5% b. Polymerization of propylene.

A 5-liter stainless steel reactor of the same type as described in a) is purged with nitrogen after which, in a stream of nitrogen, 2 liters of n-heptane, 0.96 g (8 millimoles) of monochlorodiethylaluminum and 0.93 g of the catalyst prepared in a), corresponding to 2 milliatoms/g of titanium, are introduced. When the reaction medium has been raised to 80°C, gaseous propylene is introduced in an amount to maintain a pressure of 5 bars for 3½ hours in the reactor. During the course of polymerization, small amounts of hydrogen, representing in toto a volume of 6 standard liters, are introduced.

After the polymer obtained has been extracted by being simply poured off and the solvent evaporated, a yield of 900 g of an atactic wax is obtained, which is 98% soluble in boiling n-heptane. Its mean molecular weight is 42,000.

EXAMPLE 2 a. Preparation of the catalyst.

Into a 5-liter stainless steel reactor fitted with a mechanical agitator and a means of heating and cooling, there are successively introduced, at ambient temperature and in a nitrogen atmosphere:
24.3 g (1,000 millimoles) of powdered magnesium;
35.55 g (125 millimoles) of n-propyl titanate;
23.75 g (125 millimoles) of titanium tetrachloride
and n-heptane in order to make up the volume to 800 ml.

The reaction medium is heated to 80°C under agitation. Then, by means of a pump, 185 g (2 moles) of n-butyl chloride are introduced over a period of 6 hours. The reaction medium is then maintained at 90°C for one-half hour.

The brown-black precipitate obtained has the following composition by weight:
Ti : 8% Mg : 16% Cl : 57% Organic residue: 19% b. Polymerization of the propylene.

A 5-liter stainless steel reactor of the same type described under a) is purged with nitrogen. Then, under a stream of nitrogen, 2 liters of n-heptane, 0.91 g (3 millimoles) of triethylaluminum and 1.20 g of the catalyst prepared at a), corresponding to 2 milliatoms-gram of titanium, are then introduced into the reactor. When the reaction medium has been raised to 80°C, 6 liters of hydrogen are added, and gaseous propylene is introduced at a rate such that the total pressure of the reactor remains equal to 10 bars for 2 hours.

The polymer is extracted from the reactor by simply being poured off. After evaporation of the solvent, 850 g of an atactic propylene wax are obtained, 99% soluble in boiling n-heptane, with a mean molecular mass of 30,000 and of less than 10% crystallinity measured by infra-red spectroscopy.

EXAMPLE 3 a. Preparation of the catalyst.

The same procedure is adopted as in Example 2a except that 71.1 g (250 millimoles) of n-propyl titanate are used instead of the equimolecular mixture of titanium tetrachloride and n-propyl-titanate.

After washing with n-heptane, the brown-black precipitate obtained has the following composition by weight:

Ti : 8.3% Mg : 15.7% Cl : 46.4% Organic residue: 29.6% b. Polymerization of the propylene.

The conditions of polymerization are identical to those described in Example 2 b). The catalytic system comprises 1.15 g of catalyst prepared under 3 a), corresponding to 2 milliatoms/g of titanium and 0.96 g (3 millimoles) of monochlorodiethylaluminum. After 2 hours of polymerization, 400 g of an atactic polypropylene wax are obtained, 96% soluble in boiling n-heptane, with a mean molecular mass of 46,000 and less than 15% rate of crystallinity measured by infra-red spectroscopy.

EXAMPLE 4 a. Preparation of the catalyst.

The same procedure is adopted as in Example 2a.

b. Polymerization of a propylene-ethylene mixture with 20% by weight of ethylene.

The process takes place under the general conditions described in Example 2b. The catalytic system consists of 0.91 g (8 millimoles) of triethylaluminum and 0.90 g of the solid compound described in Example 2a, corresponding to 1.5 milliatoms/g of titanium.

After having raised the reaction medium to 80°C, 2 liters of hydrogen are introduced, then the propylene-ethylene mixture containing 20% by weight of ethylene, at a rate of 160 g/hour for 6 hours. 900 g of an atactic wax, with a mean molecular mass of 60,000, completely soluble in boiling n-heptane, are then recovered from the reactor. The composition of this wax, determined by infra-red spectroscopy, is that of a statistical copolymer of propylene and ethylene containing 20% by weight of ethylene.

EXAMPLE 5 a. Preparation of the catalyst.

As in Example 2 a).

b. Polymerization of a mixture of propylene-butene-1 containing 5% by weight of butene-1.

The same procedure is adopted as in Example 4b except that a mixture of propylene and butene-1 in the amount of 5% by weight of butene-1 is introduced into the reactor instead of the mixture of propylene and ethylene.

After 4 hours of polymerization at 5 bars pressure, 470 g of an atactic wax are recovered with a mean molecular mass of 58,000, 99% soluble in boiling n-heptane. Its structure, determined by infra-red spectroscopy, is that of a statistical propylene-butene-1 copolymer.

It will be understood that changes may be made in the details of formulation and preparation without departing from the spirit of the invention, especially as defined in the following claims.

1. A process for the manufacture of atactic waxes which are substantially completely soluble in boiling n-heptane by polymerizing propylene alone or with the addition of not more than 30% by weight monoolefins having the general formula $CH_2 = CHR$ in which R is hydrogen or an alkyl radical containing 2 to 8 carbon atoms in which the polymerization is carried out at low pressure and in a hydrocarbon solvent in the presence of a catalytic system formed of (a) a catalyst prepared in a one step reaction between magnesium, an alkyl halide and a titanium compound having the general formula $TiX_{4-m}(OR')_m$ in which Ti represents titanium, X represents a halogen atom, R' represents an alkyl radical having from 2 to 8 carbon atoms and $m$ is a number within the range of 1 to 4, in which the titanium compound is present in an amount to provide 0.5 to 2 milligram-atoms of titanium per liter of solvent, and (b) a co-catalyst in the form of an organo aluminum compound having the formula $AlR''_nX_{3-n}$, in which R'' represents an alkyl radical having from 1 to 12 carbon atoms, some of which may be replaced by hydrogen atoms, X is a halogen atom and n is a number within the range of 1 to 3, the organo aluminum compound being present in an amount such that the atomic ratio of aluminum to titanium in the catalyst is within the range of 2 to 10.

2. The process as claimed in claim 1 in which the monoolefin is present in an amount less than 10% by weight of the propylene.

3. The process as claimed in claim 1 in which the halogen atom is chlorine.

4. The process as claimed in claim 1 in which $m$ is a value between 1.5 and 2.5.

5. The process as claimed in claim 1 in which the halogen is chlorine.

6. The process as claimed in claim 1 in which the amount of co-catalyst is such that the atomic ratio of aluminum in the co-catalyst to titanium in the catalyst is within the range of 3 to 5.

7. The process as claimed in claim 1 in which the polymerization is carried out at a pressure below 20 bars at a temperature within the range of 40° to 150°C and in which the solvent is a paraffinic hydrocarbon.

8. The process as claimed in claim 7 in which the paraffinic hydrocarbon is selected from the group consisting of n-heptane and a petroleum fraction consisting essentially of paraffin having from 6 to 8 carbon atoms.

9. The process as claimed in claim 1 which includes the step of separating the formed waxes from the hydrocarbon solvent after polymerization.

* * * * *